United States Patent [15] 3,668,331
Warner [45] June 6, 1972

[54] TIMING AND CONTROL CIRCUIT FOR INTERCOM TELEPHONE SYSTEM

[72] Inventor: Wesley John Warner, Mississauga, Ontario, Canada

[73] Assignee: Northern Electric Company Limited, Quebec, Canada

[22] Filed: Feb. 22, 1971

[21] Appl. No.: 117,549

[52] U.S. Cl. ....................179/84 R, 179/18 AD, 179/37, 179/18 HB, 179/1 H

[51] Int. Cl. ....................H04m 1/26

[58] Field of Search ..............179/18 AD, 18 HB, 84 R, 84 A, 179/37, 113

[56] References Cited

UNITED STATES PATENTS 2,338,218 1/1944 Vroom ....................179/84 R
3,014,097 12/1961 Apt ....................179/84 R
3,286,038 11/1966 Field et al. ....................179/18 AD

*Primary Examiner*—Kathleen H. Claffy
*Assistant Examiner*—Thomas L. Kundert
*Attorney*—John E. Mowle

[57] ABSTRACT

In an intercom telephone system, a timing capacitor located in a charging circuit has one terminal connected in the base circuit of a high gain transistor circuit. A pulsing relay follows dial pulses received and clamps the capacitor terminal voltage during each dial pulse. At the end of dialing, the pulsing relay remains operated, allowing the capacitor terminal voltage to rise sufficiently to trigger the transistor circuit, which operates a ringing relay. The ringing relay causes discharge of the capacitor and release of the transistor circuit, increases the time constant in the charging circuit, and initiates ringing for a timed period until the capacitor recharges sufficiently to retrigger the transistor circuit, which then releases the ringing relay.

12 Claims, 5 Drawing Figures

INVENTOR.
WESLEY JOHN WARNER

BY Rogers, Bereskin, & Parr

INVENTOR.
WESLEY JOHN WARNER
BY Rogers, Bereskin & Parr

INVENTOR.
WESLEY JOHN WARNER

BY Rogers, Bereskin, & Parr

TIMING AND CONTROL CIRCUIT FOR INTERCOM TELEPHONE SYSTEM

This invention relates to a timing and control circuit for an intercom telephone system.

Most intercom telephone systems include a number of stations connected to a central switching unit so that one station can call any other station by dialling one or two digits. The switching unit usually includes a ringing signal source, and means which responds to receipt of a dialled digit from a calling station to connect the ringing signal source to the called station and which then applies a ringing signal to the called station. It is usually necessary for the switching unit to recognize that dialing has ended, so that the ringing signal can then be applied. This is a timing function. In addition, in many intercom telephone systems the ringing signal consists of a timed burst of ringing signal, and in such event, it is also necessary for the control unit to provide a timed period during which the ringing signal is applied. If both single digit and two digit codes are employed, it is commonly necessary for the control unit to activate a transfer circuit. This may require an additional timing operation.

In the past, timing functions such as those required to detect the end of dialing, and to provide for a timed burst of ringing signal, have typically been achieved by arrangements such as slow release relay circuits, sometimes employing capacitors and sometimes additionally employing transistor circuits to extend the release time. These arrangements have been relatively expensive, and their timing has not been precise since the timing has been highly dependent on relay operate and release times, component values etc. In some cases, large value electrolytic type capacitors have been required for timing, resulting in very wide tolerances.

Accordingly, it is the object of the present invention to provide a simple timing and control circuit for an intercom telephone system. The circuit of the invention reacts to the start of dialling, provides a timed interval to detect the end of dialling, and then provides for a timed burst of ringing signal to the called station. According to the invention, a single capacitance is used to time both the period to detect the end of dialing and the period for which ringing is applied. In a preferred embodiment of the invention, only three relays are employed in the timing and control circuit for its timing functions, and the timing resistors employed with the capacitance are located in the input circuit of a high gain amplifier, allowing use of large resistors so that a low value capacitor can be used. The capacitor can therefore be of a foil type, rather than electrolytic, thus improving circuit tolerances so that the usual adjustable resistor is not needed. In addition, in the preferred embodiment of the invention, the timing is independent of battery voltage to a first order approximation.

Further objects and advantages of the invention will appear from the following description, taken together with the accompanying drawings, in which.

Figure 1:
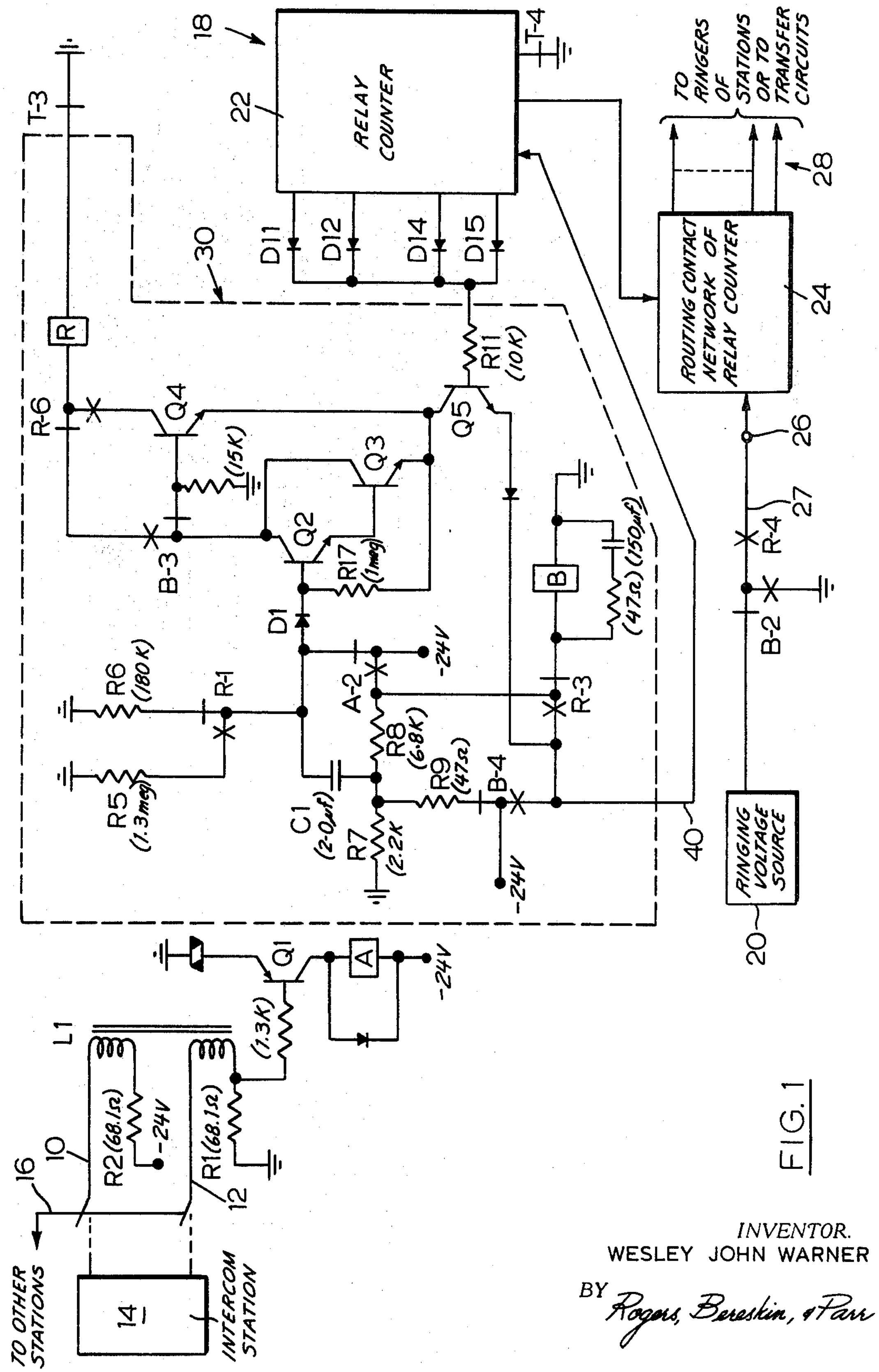
FIG. 1 is a circuit diagram showing a timing and control circuit according to the invention as connected in an intercom telephone system.

In the drawings, illustrative values are shown in parentheses beside the components. Detached contact notation is also used, in which an *x* indicates a relay contact which is open when the relay is de-energized, and a – indicates a relay contact which is closed when the relay is de-energized.

Reference is first made to FIG. 1, which shows a switching unit for an intercom telephone system. The switching unit includes tip and ring leads 10, 12 which are connected to a typical intercom station 14 and which are also connected through branch leads diagrammatically indicated at 16 to further intercom stations. Leads 10, 12 are connected through inductor L1 and resistors R1, R2 to ground and to –24 volts, to provide talking battery to the stations. The base of a transistor Q1 is connected to resistor R1, and a relay A is connected in the collector circuit of transistor Q1 whenever a party at a station lifts his handset thus connecting leads 10, 12 together.

When a calling party dials a digit, relay A releases during each dial pulse and reoperates at the end of each dial pulse. Relay A controls a conventional relay counting circuit 18, which reacts to the pulsing of relay A to connect a ringing voltage source 20 to the ringer of the station that has been called.

More specifically, the relay counting circuit 18 includes a conventional coil network 22 containing (see FIG. 2) five counting relays Y1, Y2, Y3, Y4, Y5 connected as shown and controlled by contacts A–3, A–4, A–5 of relay A. As relay A releases and reoperates during dialling, relays Y1 to Y5 when supplied with battery step through the operating combinations shown in Table I at the end of this description. In Table I, the dashes between digits indicate the intervals between dial pulses, during which relay A is operated. This is entirely conventional.

Relays Y1 to Y5 (also called the Y relays) include a disjoint routing contact network 24 (FIG. 3) having an input terminal 26 and 10 output terminals 28 numbered from 1 to 0 inclusive. As relay A releases and reoperates to step the Y relays through their operating combinations, the routing network 24 connects input terminal 26 to respective different output terminals corresponding to the number of dial pulses received. For example, after the first dial pulse, when relay A reoperates, relay Y2 is operated and input 26 is connected through contacts Y2–6 operated Y5–5 and Y4–4 released, to output terminal 1. This arrangement also is entirely conventional.

The input terminal 26 of the routing network 24 is coupled to the ringing source 20 by a ringing lead 27, while the outputs 28 are connected to the ringers of the respective stations. If there are fewer than ten stations, some outputs 28 will be unused.

Timing and control of the ringing functions are provided by a timing and control circuit 30. Circuit 30 includes a ringing relay R, a slow release relay B, and a timing capacitor C1. Capacitor C1 is connected through contacts R–1 of relay R to timing resistors R5, R6 and is also connected through diode D1 to the base of transistor Q2. Transistor Q2 is connected with transistor Q3 as a high gain Darlington pair. Transistors Q2, Q3 are controlled in part by transistor Q5, the base of which is connected through a resistor R11 to an OR gate consisting of diodes D11, D12, D14, D15. Diodes D11, D12, D14, D15 are connected respectively to the coils of relays Y1, Y2, Y4, and Y5. Transistors Q2, Q3 and Q5 together control transistor Q4, which in turn controls the release of relay R, as will be explained.

The system of FIG. 1 is best understood by a description of its operation, which is as follows.

CIRCUIT IDLE

Initially, with none of the intercom stations off hook, none of the relays in the FIG. 1 circuit are operated. The top plate (as drawn) of capacitor C1 is clamped at –24 volts through contacts A–2 of relay A, as shown at 32 in FIG. 4. The bottom plate of capacitor C1 is at a potential of approximately –24 volts applied through resistor R9 and contacts B–4 of relay B, as shown at 34 in FIG. 4.

LINE SEIZURE

When a party at station 14 lifts his handset, this connects together leads 10, 12 causing current to flow through resistor R1 and turning on transistor Q1, which operates the pulsing relay A. Contacts A–2 then operate to remove the –24 volts from the top plate of capacitor C1, and the top plate of capacitor C1 charges through resistor R6 to ground, as shown at 36 in FIG. 4.

In addition, contacts A–2 of relay A operate relay B through contacts R–3 released. When relay B operates, its contacts B–4 remove −24 volts from the bottom plate of capacitor C1, and the voltage at the bottom plate then shifts to approximately −6 volts (caused by the −24 volts from contacts A–2 operated applied to the voltage divider consisting of resistors R8, R7). This positive shift in voltage is shown at 38 in FIG. 4. Since the voltage on a capacitor cannot change instantaneously, the positive voltage step is transmitted to the top plate of capacitor C1, as indicated at 39 in FIG. 4.

Contacts B–4 operated also apply −24 volts via lead 40 to the coil network 22 of the counting circuit 18. This energizes the counting circuit, preparing it for operation upon receipt of dial pulses when a calling party begins to dial. Relay Y3 operates when the counting circuit is energized, via contacts Y1–3 and Y2–3 to ground.

Transistors Q2, Q3 are forward biased at this time, since the top plate of capacitor C1 is at ground potential, but they cannot turn on because transistor Q5 remains off since its base is open circuited.

DIALING

When the calling party dials, relay A releases and reoperates during pulsing, as previously indicated. Relay B remains operated during pulsing because it is slow release and the dial pulse is of relatively short duration (50 to 100 milliseconds).

Assume for example that the calling party dials a 2. On the first release of relay A, contacts A–2 clamp the top plate of capacitor C1 to −24 volts again, as indicated at 42 in FIG. 4. The negative voltage at the top plate of capacitor C1 biases transistors Q2, Q3 off again. In addition, the 24 volt negative step at the top plate of capacitor C1 drives the voltage on the bottom plate of capacitor C1 down to −30 volts, as shown at 44 in FIG. 4, but the bottom plate of capacitor C1 then discharges rapidly to ground through resistor R7 (with a time constant of about 4 milliseconds; see 46 of FIG. 4) and reaches ground potential before the end of the dial pulse.

In addition relay Y2 operates (see Table I) because of ground applied to the right hand side of relay Y2 via contacts A–4 and Y1–2 both released. The ground at the right hand side of the coil of relay Y2 is extended through diode D12 to the base of transistor Q5 to forward bias transistor Q5. Transistor Q5 will remain forward biased for the remainder of dialing and thereafter because at least one of relays Y1, Y2, Y4, Y5 will always be operated during this time (see Table I) so there will always be a ground applied to the base of transistor Q5. Transistor Q5 is thus enabled for the time when transistors Q2, Q3 become forward biased again.

Figure 4:
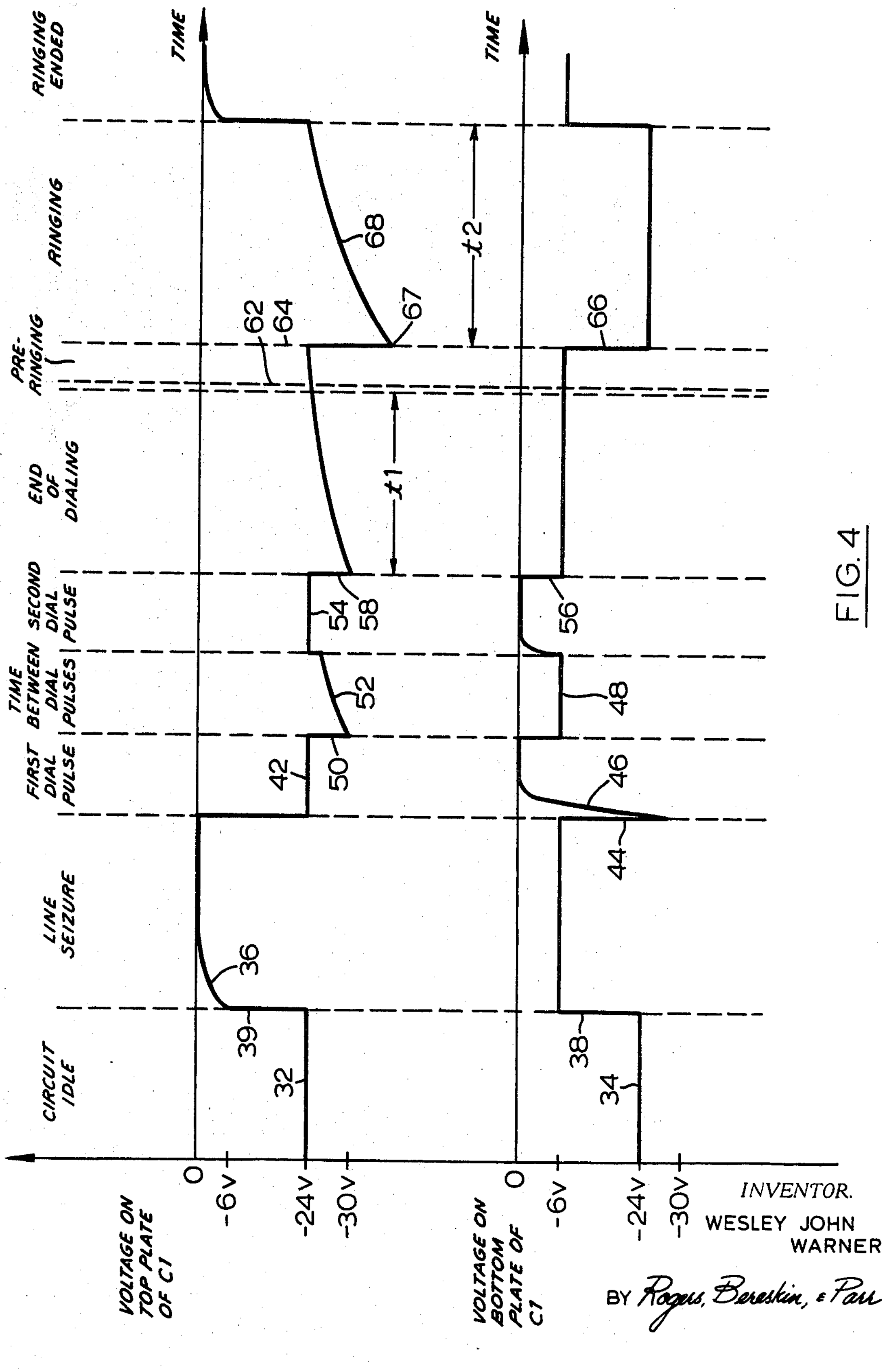
FIG. 4 shows graphically (but not to scale) the voltages on both plates of the timing capacitor of the FIG. 1 circuit.

At the end of the first dial pulse, leads 10, 12 are reconnected and relay A reoperates. When relay A reoperates, its contacts A–2 decrease the voltage at the bottom plate of capacitor C1 to −6 volts again, as shown at 48 in FIG. 4. This drives the voltage at the top plate of capacitor C1 from −24 volts to −30 volts, as shown at 50 in FIG. 4. The top plate of capacitor C1 begins to discharge towards ground through resistor R6, but with a long time constant of about 360 milliseconds. The discharge, shown at 52 in FIG. 4, is therefore very slow,and the second dial pulse occurs before the voltage at the top plate of capacitor C1 can become sufficiently positive to forward bias diode D1 and turn on transistors Q2, Q3. (The interval between dial pulses is usually about 40 to 50 milliseconds.)

On the second dial pulse, relay A releases again and contacts A–2 clamp the top plate of capacitor C1 to −24 volts again, as shown at 54 in FIG. 4. The bottom plate of capacitor C1 again discharges rapidly to ground through resistor R7.

END OF DIALING

At the end of the second dial pulse, relay A reoperates and remains operated. Contacts A–2 operate to drive the voltage at the bottom plate of capacitor C1 down to −6 volts again as indicated at 56 in FIG. 4. This drives the potential at the top plate of capacitor C1 from −24 volts to −30 volts, as indicated at 58 in FIG. 4.

Capacitor C1 then begins to discharge again through resistor R6, as shown at 60 in FIG. 4. Since dialing has ended, relay A does not release again to interfere with the discharge, and when the voltage at the top plate of capacitor C1 rises above −24 volts, diode D1 becomes forward biased and transistors Q2 and Q3 begin to turn on (since transistor Q5 is forward biased). The time period required from the end of dialing until transistors Q2 and Q3 turn on fully, indicated at $t1$ in FIG. 4, is about 79 milliseconds.

With the transistors Q2 and Q3 on, and since relay B is operated, relay R operates. The time at which transistors Q2, Q3 and relay R are operated is indicated at 62, in FIG. 4. When relay R operates, its contacts R–6 operate to turn on transistor Q4 and also to provide a locking path for relay R.

PRE-RINGING

In addition when relay R operates, its contacts R–3 remove battery from relay B. However relay B remains operated for a short interval because it is slow release. During the time interval when both relays R and B are operated, ground is applied through contacts B–2 and R–4 operated to the routing contact network 24 of the counting circuit, and hence to the output 28 corresponding to the digit dialled.

If a transfer circuit is connected to the output terminal 28 just signalled (transfer circuits are used when more than 10 codes are needed, as will be explained presently), the ground operates the transfer relay in the transfer circuit, as will be explained. However, if the output terminal 28 is connected simply to the ringer of a called station, then the ground has no effect.

RINGING

Shortly after relay R operates, relay B releases, as indicated at 64 in FIG. 4. When relay B releases, its contacts B–2 remove the ground from input 26 to the routing network and instead connect ringing voltage source 20 to input 26. The ringing voltage from source 20 is directed through the routing network 24 to operate the ringer at the called station.

It will be noted that with relay B released, −24 volts is no longer applied through contacts B–4 to lead 40 to the counting circuit coil network 22. However, the necessary −24 volts is now applied through contacts A–2 and R–3 operated to keep the counting circuit coil network 22 energized.

A new timing interval controlled by capacitor C1 now commences, to time the duration of the ring. The start of this interval is signalled by the release of relay B, which started the ring. When relay B releases, its contacts B–4 drive the voltage at the bottom plate of capacitor C1 down to about −24 volts again as indicated at 66 in FIG. 4. This 18 volt negative step drives the voltage at the top plate of capacitor C1 down to about −39 volts, as indicated at 67 in FIG. 4, thereby turning off transistors Q2 and Q3, The top plate of capacitor C1 then begins to charge toward ground through resistor R5, which has been switched into the circuit through contacts R–1 in place of resistor R6. Since resistor R5 is high resistance, the charging (shown at 68 in FIG. 4) is slow (the time constant is about 2.6 seconds). After the potential at the top plate of capacitor C1 passes above the battery potential of −24 volts, transistors Q2 and Q3 begin to turn on again. After about 1.5 seconds all together, transistors Q2 and Q3 turn on sufficiently to rob transistor Q4 of its base current, turning off transistor Q4 and hence releasing relay R. This provides a ringing duration of about 1.5 seconds.

END OF RINGING

When relay R releases, contacts R–3 remove –24 volts from lead 40, releasing all operated relays in the counting circuit and disconnecting input 26 from the outputs 28. This, as well as release of contacts R–4, terminates the ring. Contacts R–3 release to reoperate relay B. The voltage at the bottom plate of capacitor C1 then shifts back to –6 volts (69 of FIG. 2), and the top plate discharges to ground. Contacts B–4 reapply –24 volts to the counting circuit coil network 22, operating relay Y3 therein and enabling the counting circuit for redialling.

TRANSFER CIRCUIT OPERATION

If more than 10 codes are required, then a transfer circuit generally indicated at 70 (FIG. 5) is connected to one of the output terminals 28 (e.g. terminal 4) of the routing contact network 24. The transfer circuit 70 may typically include a relay T therein which operates upon receipt of the ground applied through ringing lead 27 prior to ringing. The operate path for relay T is through contacts TR–1 of a transfer relay TR to –24 volts on lead 40. Relay T then locks operated via contacts T–1, and its contact T–2 operates relay TR. Relay TR then locks operated to lead 40 and releases relay T via contacts TR–1. Contacts TR–2 may then switch the ringing lead 27 to the input 72 of the routing contact network 74 of a second counting circuit the output terminals 76 of which correspond to the second digit of two digit codes. Output terminals 76 are connected to the ringers of stations having two digit telephone numbers. Alternatively, instead of using a complete second counting circuit, the more efficient arrangement disclosed in my copending application Ser. No. 117,550 entitled "Telephone Line Transfer Circuit Using Disjoint Routing Network for Partial Decoding" filed concurrently herewith may be used,in which part of the routing contact network 24 is used for partial decoding of the second digit on two digit calls.

Figures 2, 3, 5:
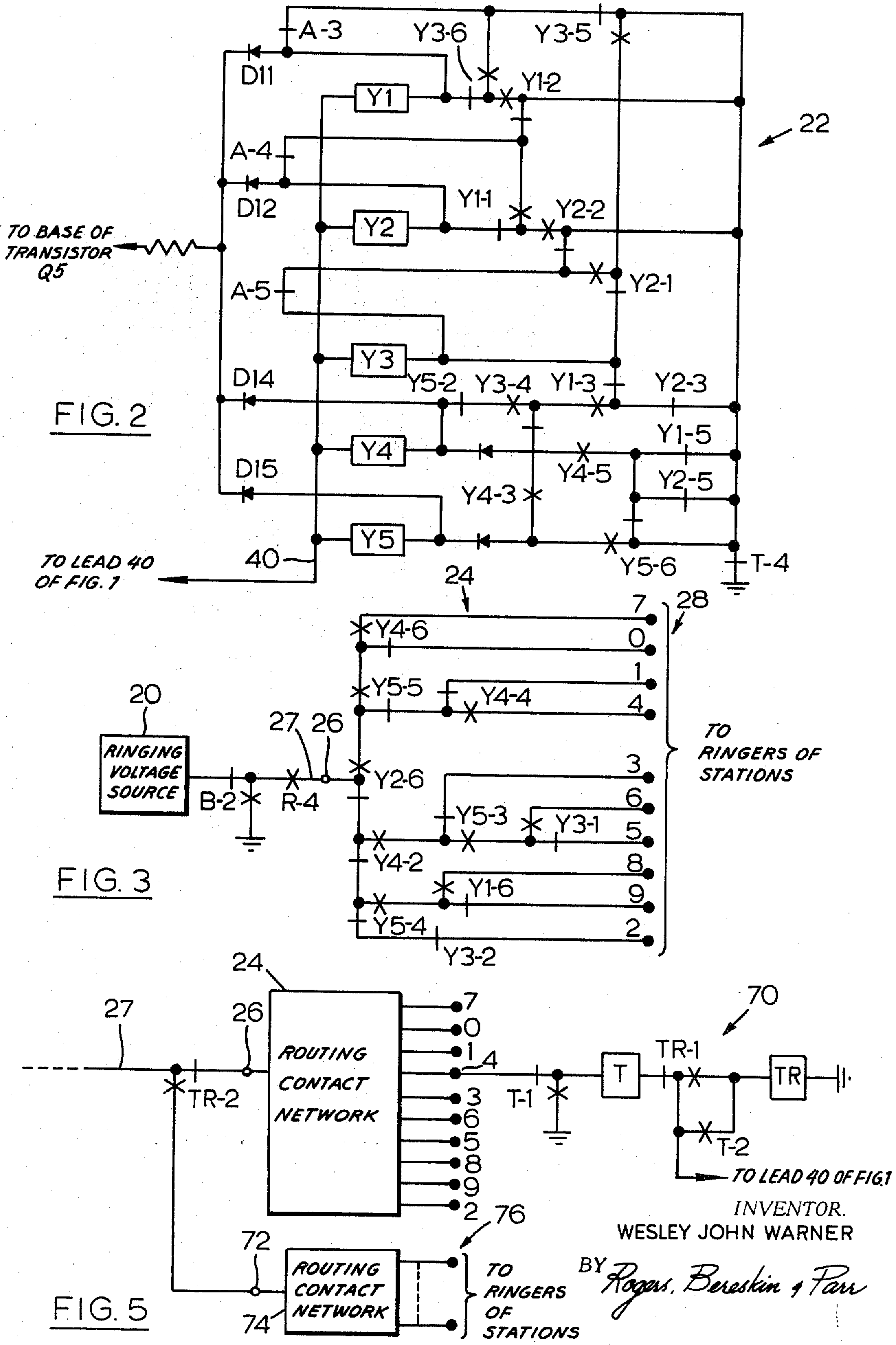
FIG. 2 is a circuit diagram showing connection of the coils of a relay tree for the FIG. 1 circuit.
FIG. 3 shows the arrangement of routing contacts for the relay tree of FIG. 2.
FIG. 5 is a block diagram showing connection of a transfer circuit to the relay tree routing contacts.

When a transfer circuit is connected to an output of routing contact network 24, relay T of the transfer circuit will include a contact T–3 connected between relay R and ground (FIG. 1) and a contact T–4 connected in the ground circuit of the counting circuit coil network 22 (FIG. 2). Contacts T–3, T–4 may be constituted by the same contact. Thus, when relay T in the transfer circuit operates upon operation of relay R, contact T–3 releases relay R immediately, preventing release of relay B and thus preventing application of a ringing voltage to input 26 and also preventing removal of battery from lead 40. In addition, contact T–4 releases all operated relays in the relay tree, thus preparing the counting circuit for receipt of the next digit.

It will be noted that because transistors Q2, Q3 form a high gain Darlington connected pair, very little current need be supplied to the base of transistor Q2 to ensure saturation. Thus the value of resistors R4, R5 can be (and is) high, allowing a useful time constant with a low value capacitor. The capacitor C1 can thus be a foil type capacitor, rather than electrolytic, improving circuit tolerances.

The time interval $t1$ required at the end of dialling before relay R operates may be calculated roughly as follows. If the battery voltage (–24 volts here) is termed Vcc, then when relay A reoperates at the end of dialling, the negative step at the bottom plate of capacitor C1 is Vcc R7/(R7 + R8) (i.e. about 6 volts with the values given) and the voltage v at the top plate of capacitor C1 is at this time (Vcc + Vcc) R7/(R7 + R8).

The voltage $v$ at the top plate of capacitor C1 then approaches ground exponentially, i.e.

$$v = Vcc\left(1+\frac{R7}{R7+R8}\right)e^{\frac{-t}{R6\cdot C1}}$$

When $v$ passes $Vcc$, at time $t1$, transistors Q2, Q3 begin to turn on, i.e.

$$Vcc = Vcc\left(1+\frac{R7}{R7+R8}\right)e^{\frac{-t1}{R6\cdot C1}}$$

or $$t1 = R6\cdot C1\ \ln\left(1+\frac{R7}{R7+R8}\right)$$

Inserting the nominal values given, $$t1 = 0.180 \times 2 \times \ln\,(1 + (2.2/9.0))\ \text{seconds}$$
$$= 79\ \text{milliseconds}$$

It will be noted that in this first order calculation, the time delay t1 is independent of battery voltage.

Similarly, at the commencement of the ringing period when relay B releases, the voltage at the bottom plate of capacitor $C1$ drops from $Vcc\ R7/(R7+R8)$ volts i.e. about –6 volts) to $Vcc$, i.e. the drop is $Vcc\ R8/(R7+R8)$ volts. The voltage $v$ at the top plate of capacitor $C1$ then drops from about $Vcc$ volts to $Vcc\ (1+R8/(R7+R8))$ volts and then increases exponentially (as shown at 68 in FIG. 4) according to the equation:

$$v = Vcc\left(1+\frac{R8}{R7+R8}\right)e^{\frac{-t}{R5C1}}$$

At time $t2$, when transistors Q2, Q3 turn on to release relay $R$, $V \approx Vcc$, so $t2 = R5\cdot C1\ \ln\,(1 + R8/(R7+R8))$ Again inserting the values shown, $t2 = 1.3 \times 3 \times \ln 1.755$ $= 1.46$ seconds.

Again, the time $t2$ until relay $R$ begins to release is independent of battery voltage to a first order approximation. These calculations are approximate because, for example, the voltage at the base of transistor Q1 must actually riseslightly above the battery voltage before transistors Q1, Q2 turn on.

In FIG. 1, the normally open contact of contacts R–1 may be eliminated if desired. In such event, resistor R5 remains in parallel with resistor $R6$ when relay $R$ is released, thus reducing slightly the effective resistance in the timing circuit, but the value of resistor $R6$ can be increased to compensate for this.

What I claim is:

1. For an intercom telephone system of the type including a plurality of stations, pulsing switch means normally operated by a calling station, means for releasing said pulsing switch means during receipt of each dial pulse from said calling station and for reoperating said pulsing switch means following each dial pulse, a source of ringing voltage, routing means having a plurality of output terminals and responsive to operation of said pulsing switch means for coupling said ringing voltage source to an output terminal corresponding to the digit dialled; a timing and control circuit comprising:

a. a timing capacitance having a first terminal, b. switch means, said switch means including ringing means operative upon operation of said switch means to connect said ringing voltage source to said routing means, c. means for enabling said switch means during receipt of dial pulses, d. said first terminal of said capacitance being coupled to said switch means to operate said switch means provided that said switch means is enabled, when the potential at said first terminal reaches a first predetermined level, e. a charging circuit including a resistance, and means connecting said charging circuit to said capacitance for varying the charge on said capacitance with a first time constant, f. means responsive to receipt of each dial pulse for shifting the potential at said first terminal to a second predetermined level different from said first predetermined level and at which said ringing switch means will not operate, and then permitting the charge on said capacitance to vary through said charging circuit to vary the potential at said first terminal toward said first level following the end of such dial pulse, the difference between said first and second predetermined levels and said first time constant being such that a time greater than the time between dial pulses is required for the potential at said first terminal to reach said first predetermined level, so that said switch means and hence said ringing means will operate only after completion of receipt of a digit from said calling station, g. means responsive to operation of said ringing means to maintain said ringing means operated, h. means responsive to operation of said ringing means for increasing the resistance in said charging circuit, i. means responsive to operation of said ringing means for shifting the potential at said first terminal of said capacitance to a third predetermined level to turn off said switch means and then permitting the potential at said first terminal to vary toward said first predetermined level with a second time constant greater than said first time constant, j. and means connected to said switch means and responsive to reoperation thereof with said ringing means operated to turn off said ringing means, thereby to terminate ringing.

2. A timing and control circuit according to claim 1 wherein said switch means includes a high gain amplifier having an input and a switched output, said first terminal of said capacitance being coupled to said input of said amplifier to turn on said amplifier when the potential at said first terminal reaches said first predetermined level, said means (c) including means for biasing said amplifier off until receipt of a first dial pulse from said calling station, and means connecting said output of said amplifier to control said ringing means.

3. A timing and control circuit according to claim 2 wherein said ringing means includes a ringing relay having a plurality of contacts, and said means (h) includes a second resistance of value greater than said first mentioned resistance, and means including a contact of said ringing relay for switching said second resistance into said charging circuit in place of said first mentioned resistance.

4. For an intercom telephone system of the type including a plurality of stations, pulsing switch means normally operated by a calling station, means for releasing said pulsing switch means during receipt of each dial pulse from said calling station and for reoperating said pulsing switch means following each dial pulse, a source of ringing voltage, routing means having a plurality of output terminals and responsive to operation of said pulsing switch means for coupling said ringing voltage source to an output terminal corresponding to the digit dialled; a timing and control circuit comprising:

a. a timing capacitance having a first and second terminals, b. an amplifier, c. means coupled to said amplifer and responsive to operation of said pulsing switch means to disable said amplifier until receipt of a first dial pulse and then to enable said amplifier, d. said first terminal of said capacitance being coupled to said amplifier to turn on said amplifier provided that said amplifier is enabled, when the potential at said first terminal reaches a first predetermined level, e. a charging circuit,including a resistance having a first value,for charging said capacitance with a first time constant, f. means responsive to each release of said pulsing switch means during receipt of a dial pulse for shifting the potential at said first terminal of said capacitance to a second predetermined level different from said first predetermined level during such dial pulse and then permitting said capacitance to charge again through said charging circuit, the difference between said first and second predetermined levels and first time constant being such that said capacitance requires a time greater than the time between dial pulses to recharge to said first predetermined level, so that said amplifier will turn on only after receipt of a complete digit from said calling station, g. ringing switch means operative in response to operation of said amplifier to connect said ringing voltage source to said routing means, h. means responsive to operation of said ringing switch means to maintain said ringing switch means operated, i. means responsive to operation of said ringing switch means to shift the potential at said first terminal of said capacitance to a third predetermined level to turn off said amplifier, j. means responsive to operation of said ringing switch means for increasing the resistance in said charging circuit to a second value greater than said first value so that said capacitance will then recharge towards said first predetermined level with a second time constant longer than said first time constant, k. and means connected to said amplifier and responsive to reoperation thereof with said ringing switch means operated to terminate operation of said ringing switch means thereby to terminate said ringing after a ringing period timed by charging of said capacitance with said second time constant.

5. A circuit according to claim 4 wherein said amplifier is a high gain amplifier, said first and second resistance values are high value with said first resistance being of the order of at least substantially 100,000 ohms.

6. A circuit according to claim 5 wherein said pulsing switch means is a pulsing relay having a plurality of contacts, said ringing switch means is a ringing relay having a plurality of contacts, said resistance being connected to said first terminal of said capacitance through a contact of said ringing relay, said means (f) including a contact of said pulsing relay connected to said first terminal of said capacitance and for connection to a voltage source for clamping said first terminal of said capacitance at a fixed potential during receipt of each dial pulse.

7. A circuit according to claim 6 wherein said means (f) further includes a further contact of said pulsing relay and means connecting said further contact to said second terminal of said capacitance for applying a voltage to said second terminal of said capacitance at the end of each dial pulse to shift the potential at said first terminal of said capacitance to said second level at the end of each dial pulse.

8. A circuit according to claim 4 wherein said means (i) includes a contact of said ringing relay and means responsive to operation of such contact of said ringing relay for clamping the potential at said second terminal of said capacitance at a fixed level to shift the potential at said first terminal of said capacitance to said third predetermined level.

9. A circuit according to claim 8 wherein said means responsive to operation of said contact of said ringing relay includes a slow release relay having a plurality of contacts,means for normally operating said slow release relay upon operation of said pulsing relay and during dialling, and means for releasing said slow release relay upon operation of said contact of said ringing relay, said means (g) including a normally closed contact of said slow release relay, so that after operation of said ringing relay,connection of said ringing voltage source to said routing means is delayed by the release time of said slow release relay.

10. A circuit according to claim 9 including means including contacts of said ringing and slow release relays for applying a transfer signal to said routing means after operation of said ringing relay and before release of said slow release relay, said transfer signal being adapted to operate a transfer circuit connected to a signalled output terminal of said routing means.

11. A circuit according to claim 6 wherein said means (h) and(k) together include a locking circuit, including a contact of said ringing relay, for locking said ringing relay operated upon operation of said ringing relay, said locking circuit including means responsive to operation of said amplifier subsequent to operation of said ringing relay to open said locking circuit thus to de-energize said ringing relay.

12. A circuit according to claim 1, wherein said capacitance is a foil type capacitor.

* * * * *